(12) United States Patent
Hitaj et al.

(10) Patent No.: US 11,669,612 B2
(45) Date of Patent: Jun. 6, 2023

(54) SYSTEM AND PROCESS FOR GENERATING PASSWORDS OR PASSWORD GUESSES

(71) Applicants: THE TRUSTEES OF THE STEVENS INSTITUTE OF TECHNOLOGY, Hoboken, NJ (US); NEW YORK INSTITUTE OF TECHNOLOGY, INC., New York, NY (US)

(72) Inventors: Briland Hitaj, Jersey City, NJ (US); Giuseppe Ateniese, Hoboken, NJ (US); Fernando Perez-Cruz, Zurich (CH); Paolo Gasti, New York, NY (US)

(73) Assignee: THE TRUSTEES OF THE STEVENS INSTITUTE GF TECHNOLOGY, Hoboken, NJ (US)

( * ) Notice: Subject to any disclaimer, the term of this patent is extended or adjusted under 35 U.S.C. 154(b) by 895 days.

(21) Appl. No.: 16/557,416

(22) Filed: Aug. 30, 2019

(65) Prior Publication Data

US 2020/0074073 A1 Mar. 5, 2020

Related U.S. Application Data

(60) Provisional application No. 62/726,161, filed on Aug. 31, 2018.

(51) Int. Cl.
*G06F 7/04* (2006.01)
*G06F 15/16* (2006.01)
(Continued)

(52) U.S. Cl.
CPC ............ *G06F 21/46* (2013.01); *G06N 3/045* (2023.01); *G06N 3/08* (2013.01)

(58) Field of Classification Search
CPC ...... G06N 3/0454; G06N 3/0445; G06N 3/08; G06N 3/088; G06N 5/02; G06N 5/04;
(Continued)

(56) References Cited

U.S. PATENT DOCUMENTS

2019/0114348 A1* 4/2019 Gao ................... G06N 3/082
2019/0121953 A1* 4/2019 Chari ................. G06F 21/35
(Continued)

OTHER PUBLICATIONS

Gulrajani, Ishaan, et al. "Improved training ofwasserstein gans." Advances in neural information processing systems 30 (2017). (Year: 2017).*

(Continued)

*Primary Examiner* — Michael Ortiz-Sanchez
(74) *Attorney, Agent, or Firm* — Lewis Roca Rothgerber Christie LLP

(57) ABSTRACT

Embodiments of the invention provide a system including a first logic module for receiving a data stream that includes at least one neural network configured to generate at least one first password sample based at least in part on at least a portion of the data stream. A second logic module can be operatively coupled to the first logic module to receive the first password sample and at least one input dataset including a second password sample. The system can perform calculations to distinguish between at least one password of the first password sample and at least one password of the second password sample. Further, the system can iteratively learn and produce a feedback dataset based on the calculations, where the feedback dataset is configured to be provided to the first logic module.

20 Claims, 8 Drawing Sheets

(51) Int. Cl.
  *H04L 29/06*   (2006.01)
  *G06F 21/46*   (2013.01)
  *G06N 3/08*    (2023.01)
  *G06N 3/045*   (2023.01)

(58) Field of Classification Search
  CPC .......... G06N 5/003; G06N 20/00; G06N 7/00;
         G06N 7/005; G06N 5/00; G06N 3/045;
         G06F 21/46; G06F 21/45; G06F 21/30;
         G06F 21/305; G06F 21/31; G06F 21/44;
         G06F 21/55; G06F 21/577; G06F 21/604;
         G06F 21/62; G06F 21/60; G06F 21/00
  See application file for complete search history.

(56) References Cited

U.S. PATENT DOCUMENTS

| | | | |
|---|---|---|---|
| 2020/0019863 A1* | 1/2020 | Dua | G10L 15/197 |
| 2020/0097554 A1* | 3/2020 | Rezagholizadeh | G06N 3/0472 |

OTHER PUBLICATIONS

Hitaj, B., Gasti, P., Ateniese, G., & Perez-Cruz, F. (Jun. 2019). Passgan: A deep learning approach for password guessing. In International conference on applied cryptography and network security (pp. 217-237). Springer, Cham. (Year: 2019).*

Hitaj, Briland et al., "PassGAN: A Deep Learning Approach for Password Guessing", arXiv:1709.00440v3, Feb. 14, 2019 (14 pages).

* cited by examiner

| Password | Rank in Training Set | Frequency in Training Set | Frequency in GAN System's Output |
|---|---|---|---|
| 123456 | 1 | 0.9833% | 1.0096% |
| 123456789 | 3 | 0.25985% | 0.222% |
| 12345 | 2 | 0.26662% | 0.2162% |
| iloveyou | 5 | 0.16908% | 0.1006% |
| 1234567 | 7 | 0.07348% | 0.0755% |
| angel | 33 | 0.03558% | 0.0638% |
| 12345678 | 9 | 0.06983% | 0.0508% |
| iloveu | 21 | 0.04471% | 0.0485% |
| angels | 109 | 0.01921% | 0.0338% |
| daniel | 12 | 0.0521% | 0.033% |
| sweety | 90 | 0.02171% | 0.0257% |
| angels | 57 | 0.02787% | 0.0245% |
| maria | 210 | 0.01342% | 0.0159% |
| loveyou | 52 | 0.0287% | 0.0154% |
| andrew | 55 | 0.02815% | 0.0131% |
| 123256 | 301,429 | 0.00003% | 0.013% |
| iluvlu | -- | -- | 0.0127% |
| dangel | 38,800 | 0.00018% | 0.0123% |
| michel | 1,442 | 0.00335% | 0.0119% |
| marie | 483 | 0.00755% | 0.0118% |
| andres | 223 | 0.01274% | 0.0106% |
| lovely | 15 | 0.0487% | 0.0103% |
| 123458 | 7,352 | 0.00076% | 0.0099% |
| sweet | 329 | 0.00999% | 0.0097% |
| prince | 243 | 0.01217% | 0.0092% |
| ilove | 2,177 | 0.00234% | 0.0089% |
| hello | 61 | 0.02648% | 0.0086% |
| angell | 184 | 0.01459% | 0.0085% |
| iluveu | 58,131 | 0.00013% | 0.0083% |
| 723456 | 337,321 | 0.00003% | 0.0082% |
| loveu | 852 | 0.00505% | 0.0082% |
| lovers | 70 | 0.0253% | 0.0082% |
| iluvlyou | -- | -- | 0.0082% |
| bella | 732 | 0.00562% | 0.0081% |
| andrea | 43 | 0.03123% | 0.0081% |
| iluveyou | 183,386 | 0.00004% | 0.0079% |
| kella | 180,219 | 0.00004% | 0.0076% |
| michelle | 24 | 0.04312% | 0.0074% |
| mariana | 228 | 0.01265% | 0.0074% |
| marian | 681 | 0.00593% | 0.0073% |
| daniela | 95 | 0.02064% | 0.0072% |
| dancer | 122 | 0.01799% | 0.0072% |
| lovery | 46,470 | 0.00016% | 0.0071% |
| dancel | 42,692 | 0.00017% | 0.007% |
| 23456 | 3,976 | 0.00134% | 0.007% |
| 1g3456 | -- | -- | 0.007% |
| loveme | 37 | 0.03302% | 0.007% |
| jessie | 213 | 0.01329% | 0.0069% |
| buster | 145 | 0.01619% | 0.0068% |
| anger | 172,425 | 0.00005% | 0.0067% |

FIG. 3

| Passwords Generated | Unique Passwords | Passwords matched in testing set, and not in training set (1,978,367 unique samples) |
|---|---|---|
| $10^4$ | 9,738 | 103 (0.005%) |
| $10^5$ | 94,400 | 957 (0.048%) |
| $10^6$ | 855,972 | 7,543 (0.381%) |
| $10^7$ | 7,064,483 | 40,320 (2.038%) |
| $10^8$ | 52,815,412 | 133,061 (6.726%) |
| $10^9$ | 356,216,832 | 298,608 (15.094%) |
| $10^{10}$ | 2,152,819,961 | 515,079 (26.036%) |
| $2 \cdot 10^{10}$ | 3,617,982,306 | 584,466 (29.543%) |
| $3 \cdot 10^{10}$ | 4,877,585,915 | 625,245 (31.604%) |
| $4 \cdot 10^{10}$ | 6,015,716,395 | 653,978 (33.056%) |
| $5 \cdot 10^{10}$ | 7,069,285,569 | 676,439 (34.192%) |

FIG. 4

| | | | |
|---|---|---|---|
| love42743 | ilovey2b93 | paolo9630 | italyit |
| sadgross | usa2598 | s13trumpy | trumpart3 |
| ttybaby5 | dark1106 | vamperiosa | ^dracula |
| saddracula | hrvengland | albania. | bananabake |
| paleyoung | @crepess | emily1015 | enemy20 |
| goku476 | coolarse18 | iscoolin | serious003 |
| nyc1234 | thepotus12 | greatrun | babybad528 |
| santazone | apple8487 | 1loveyoung | bitchin706 |
| toshibaod | tweet1997b | 103tears | 1holys01 |

FIG. 7

SYSTEM AND PROCESS FOR GENERATING PASSWORDS OR PASSWORD GUESSES

RELATED APPLICATIONS

This application claims priority to United States provisional application Ser. No. 62/726,161, filed on Aug. 31, 2018, the entire contents of which are incorporated herein by reference.

FIELD OF THE INVENTION

This invention relates to systems and processes for generating passwords or password guesses.

BACKGROUND OF THE INVENTION

Passwords are the most popular authentication method, mainly because they are easy to implement, require no special hardware or software, and are familiar to users and developers. Unfortunately, multiple password database leaks have shown that users tend to choose easy-to-guess passwords, primarily composed of common strings (e.g., password, 123456, iloveyou, etc.), and variants thereof.

Password guessing tools provide a valuable tool for identifying weak passwords, especially when they are stored in hashed form. The effectiveness of password guessing software relies on the ability to quickly test a large number of highly likely passwords against each password hash. Instead of exhaustively trying all possible character combinations, password guessing tools use words from dictionaries and previous password leaks as candidate passwords. State-of-the-art password guessing tools, such as those known as "John the Ripper" and "HashCat", take this approach one step further by defining heuristics for password transformations, which include combinations of multiple words (e.g., iloveyou123456), mixed letter case (e.g., iLoVeyOu), and leet speak (e.g., il0v3you). These heuristics, in conjunction with Markov models, allow the "John the Ripper" and "HashCat" tools to generate a large number of new highly likely passwords.

While these heuristics are reasonably successful in practice, they are ad-hoc and based on intuitions on how users choose passwords. As a result, each technique is ultimately limited to capturing a specific subset of the password space which depends upon the intuition behind that technique. Further, developing and testing new rules and heuristics is a time-consuming task that requires specialized expertise, and therefore has limited scalability.

SUMMARY

Some embodiments include a system comprising at least one processor configured to be coupled to a non-transitory computer-readable storage medium storing thereon a program logic for execution by the at least one processor. The program logic includes a first logic module executable by the at least one processor for receiving at least one data stream. The first logic module includes at least one neural network configured to generate at least one first password sample based at least in part on at least a portion of the at least one data stream. Further, a second logic module executable by the at least one processor can be operatively coupled to the first logic module. The second logic module is configured to receive the at least one first password sample and at least one input dataset including at least one second password sample to perform calculations in order to distinguish between at least one password of the at least one first password sample, and at least one password of the at least one second password sample. Further, the system can iteratively learn and produce a feedback dataset based on the calculations, where the feedback dataset is configured to be provided to the first logic module.

In some embodiments, the at least one data stream includes a random Gaussian or uniform distribution. In some further embodiments, the feedback dataset provided to the first logic module is used to generate further password samples that are distributed closer to the at least one second password sample. In some embodiments, the at least one neural network is configured to generate the at least one first password sample based at least in part on at least a portion of the feedback dataset. In some other embodiments, the feedback dataset is calculated by the at least one first logic module by iterative learning and convergence to at least one optimization solution of at least one model.

In some embodiments, the at least one neural network of the first logic module includes a generative deep neural network, and the second logic module includes a discriminative deep neural network, the generative deep neural network and discriminative deep neural network in combination forming a generative adversarial network (GAN). In some embodiments of the system, the generative adversarial network (GAN) includes an improved Wasserstein generative adversarial network (IWGAN).

Some embodiments include a method comprising: (a) providing at least one non-transitory computer-readable storage medium including program logic of a generative adversarial network (GAN); (b) providing at least one processor configured to be operatively coupled to the at least one non-transitory computer-readable storage medium; (c) executing, by the at least one processor, at least a portion of a first logic module of the program logic to generate at least one first password sample based at least in part on at least a portion of at least one data stream received by the at least one processor; (d) executing, by the at least one processor, at least a portion of a second logic module, the second logic module operatively coupled to the first logic module, wherein the second logic module receives the at least one first password sample from the first logic module and at least one second password sample from at least one input dataset, and wherein the at least one processor performs calculations based on at least one model in order to distinguish between at least one password of the at least one first password sample and at least one password of the at least one second password sample and to iteratively and produce a feedback dataset based on the calculations; and (e) providing the feedback dataset to the first logic module.

Some embodiments further comprise the step of (f) executing, by the at least one processor, at least a portion of the first logic module to update the at least one first password sample with at least one further password sample based at least in part on at least a portion of the at least one data stream and the feedback dataset.

Some embodiments further comprise the steps of (g) providing the at least one first password sample including the at least one further password sample from the first logic module to the second logic module; and (h) repeating the steps (c)-(f) at least once to generate further password samples that are distributed closer to password samples of the at least one input dataset.

In some embodiments, the first logic module includes a generative deep neural network, and the second logic module includes a discriminative deep neural network. In some embodiments of the method, the generative adversarial network (GAN) includes an improved Wasserstein generative adversarial network ("IWGAN"). In some embodiments, the at least one model utilizes:

$$\min_{\theta_G} \max_{\theta_D} \sum_{i=1}^{n} \log f(x_i; \theta_D) + \sum_{j=1}^{n} \log(1 - f(g(z_j; \theta_G); \theta_D))$$

where $\theta_G$ and $\theta_D$ are the parameters of the first and second logic modules, $x_i$ represents an input dataset, and $z_j$ is a noise distribution.

In some embodiments, the program logic executable by the at least one processor includes code that performs a training operation for the first logic module and the second logic module. The training operation includes operations involving exchange of password-related data between the first and second logic modules based at least in part on the at least one data stream and the at least one input dataset. In some embodiments, the training operation is configured to include a first logic module iteration associated with one or more second logic module iterations.

In some embodiments, the program logic executable by the at least one processor includes code configured to train the generative adversarial network (GAN) including the improved Wasserstein generative adversarial network (IWGAN) using a gradient penalty.

BRIEF DESCRIPTION OF THE DRAWINGS

FIG. 3 is a table illustrating fifty most frequent passwords, in accordance with an embodiment of the present invention.

FIG. 4 is a table showing sample passwords generated by the system of FIG. 1A that did not match testing sets, in accordance with an embodiment of the present invention.

FIG. 7 is a table illustrating sample passwords generated by the system of FIG. 1A that did not match testing sets, in accordance with an embodiment of the present invention.

DETAILED DESCRIPTION OF EMBODIMENTS

Figure 1A:
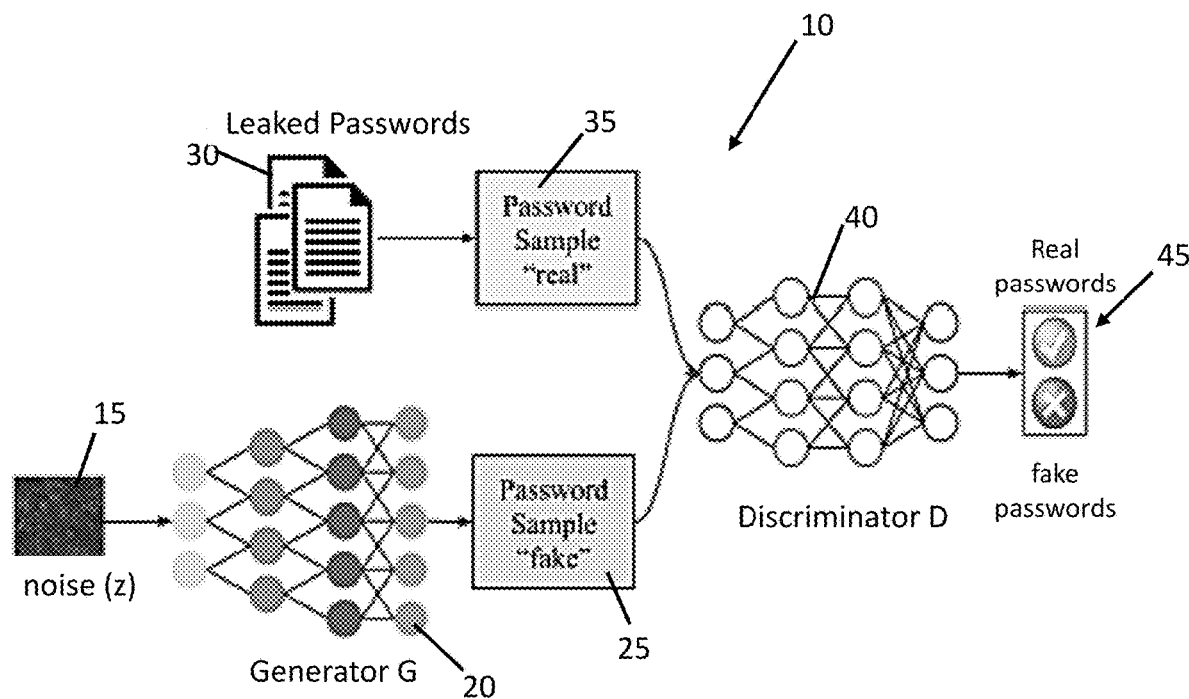
FIG. 1A is a schematic diagram illustrating a process and system for generating passwords or password guesses, in accordance with an embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches to systems and methods to data processing and management that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and methods described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple password-related content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for generating passwords or password guesses for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea, and further provide significantly more tangible innovation. Moreover, the functionalities described herein were not imaginable in previously-existing computing systems, and did not exist until some embodiments of the invention solved the technical problem described earlier.

Some embodiments of the invention include novel approaches that replace human-generated password rules with theory-grounded machine learning systems and processes. Some embodiments include a password guessing system and process that utilizes deep learning and generative adversarial networks (hereinafter "GANs") to autonomously learn the distribution of real passwords from actual password leaks (i.e., known passwords), and to generate high quality password guesses. Some embodiments are adapted to generate passwords with no or little user intervention, thus requiring no domain knowledge on passwords, nor manual analysis of a database of leaked passwords. In some embodiments, the use of a deep learning approach based on GANs and training on large password datasets can facilitate the effectiveness of the password guessing system and process.

In one embodiment, the present invention includes several parts that work together to generate high-quality password guesses. For example, in some embodiments, a generative deep neural network can generate fake sample passwords using noise distribution, and a discriminative deep neural network can receive the fake sample passwords and an input dataset comprising real password samples (e.g., such as those from a dataset from leaked or known passwords). Through a process of iterative learning, in combination, the generative deep neural network and the discriminative deep neural network can learn to distinguish fake sample passwords from the real passwords in the input dataset. For example, at each iteration, the discriminative deep neural network's output can be used by the generative deep neural network as feedback to generate fake samples that are distributed closer to the real samples. As a consequence, the output (composed of fake samples) of the generative deep neural network can move iteratively closer to matching the real password samples. Further details are provided in the following narrative and associated FIGS. 1A, 1B, and FIGS. 2-8.

FIG. 1A schematically illustrates a password-guessing system 10 for generating passwords or password guesses in accordance with one embodiment. More particularly, the system 10, which is configured to generate password guesses based on deep learning, involves training neural networks to autonomously determine password characteristics and structures, and to leverage this knowledge to generate new samples that follow the same or similar distribution. Deep neural networks in the present invention can be expressive enough to capture a large variety of properties and structures that describe a majority of user-chosen passwords, and, at the same time, they can be trained without any a-priori knowledge or assumption on such properties and structures. This is in contrast with current approaches, such as processes utilizing Markov models (which implicitly assume that all relevant password characteristics can be defined in terms of n-grams), and rule-based approaches (which can guess only passwords that match with the available rules). As a result, samples generated using one or more neural networks in accordance with embodiments of the present invention are not limited to a particular subset of the password space. Instead, the neural networks of the system 10 can be configured to autonomously encode a wide range of password-guessing knowledge that includes and surpasses what is captured in human-generated rules and Markovian password generation processes.

While various forms of neural networks may be utilized, generative adversarial networks (GANs) are found to be especially suitable for use in conjunction with the present invention. GANs are machine-learning tools designed to perform density estimation in high-dimensional spaces (see, e.g., Goodfellow et al., "Generative Adversarial Nets", *Advances In Neural Information Processing Systems*, 2014, pp. 2672-2680 (see also arXiv:1406.2661v1 [stat.ML]), the entire disclosure of which is incorporated herein by reference). In one embodiment, GANs perform implicit generative modeling by training a deep neural network architecture that is fed a simple random distribution (e.g., Gaussian or uniform) and by generating samples that follow the distribution of the available data. In a way, they implicitly model $x=F^{-1}(s)$ where $F(x)$ is the cumulative density function of the data and s is a uniformly distributed random variable. In one embodiment, to train the generative structure, GANs use a cat-and-mouse game in which a deep generative network tries to mimic the underlying distribution of the samples and a discriminative deep neural network tries to distinguish between the original training samples (i.e., "true samples") and the samples generated by the generative deep neural network (i.e., "fake samples"). In accordance with one embodiment, this adversarial procedure forces the discriminative deep neural network into leaking the relevant information for the deep generative network to be effective at mimicking the original distribution of the data.

Referring to FIG. 1A, in one embodiment, a GAN is composed of neural networks, a generative deep neural network "G" (shown as generator 20), and a discriminative deep neural network "D" (shown as discriminator 40). Given an input dataset $I=\{x_1; x_2, \ldots, x_n\}$, the goal of the generative deep neural network G is to produce "fake" samples from the underlying probability distribution $Pr(x)$, that are accepted by the discriminative deep neural network D. At the same time, the discriminative deep neural network D includes a goal to learn to distinguish fake samples from the generative deep neural network G from the real ones coming from I. More formally, on input a simple noise distribution z, the optimization problem solved by GANs can be summarized as follows:

$$\min_{\theta_G}\max_{\theta_D} \sum_{i=1}^{n} \log f(x_i; \theta_D) + \sum_{j=1}^{n} \log(1 - f(g(z_j; \theta_G); \theta_D))$$

where the model attempts to minimize with respect to $\theta_G$, and simultaneously maximize with respect to $\theta_D$. In accordance with one embodiment, the learning phase is considered complete when the discriminative deep neural network D is unable to distinguish between the fake samples produced by the generative deep neural network G, and the real samples from I.

In some embodiments, the system 10 includes discriminator 40 (i.e., discriminative deep neural network D) for processing passwords from a training dataset. More particularly, the discriminator 40 is trained using a list or dataset of leaked/known passwords ("real samples") (training dataset 35), as well as password samples ("fake samples") 25 produced by a generator 20 (i.e., a generative deep neural network G). The generator 20 and discriminator 40 can each be embodied as program logic executable by one or more processors of one or more computers. For example, the generator 20 can include a first logic module executable by at least one processor of a computer system, and the discriminator 40 can include a second logic module executable by at least one processor of a computer system.

The goal of the discriminator 40 is to distinguish between the "real samples" (i.e., actual leaked/known passwords), and "fake samples" generated by the generator 20. The discriminator 40 and the generator 20 interact with each other over many iterations. In each iteration, fake samples from the generator 20 are provided to the discriminator 40. When the generator 20 produces a sample 25 (in this case a password sample), this sample 25 is forwarded as input to the discriminator 40. The discriminator 40 classifies the given input as "real" or "fake" with a certain probability, based on how close the given sample is with the actual real data (real passwords) (training dataset 35). As such, the discriminator 40 sends back (back-propagates) to the generator 20 the gradients calculated based on its output with respect to the provided sample. The generator 20 uses these gradients to update its inner parameters, thus improving on sample generation for the next iteration. Based on the classification output of the discriminator 40 (i.e., correct classification as "fake sample" 25, or incorrect classification as "real sample", shown as the training dataset 35) the generator 20 adjusts its internal parameters. The goal of this step is to cause the discriminator 40 to incorrectly classify all output of the generator 20 as "real samples" which indicates that the "fake samples" from the generator 20 are indistinguishable from "real samples" from the leaked/known password datasets. Therefore, at each iteration, the output (fake samples) of the generator 20 becomes closer to the distribution of passwords in the original leak, and hence more likely to match real users' passwords. Thus, the system 10 solves the problem of conventional systems by autonomously learning the distribution of real passwords from actual password leaks and generating high-quality password guesses as output 45.

While various types of GANs may be used, in one embodiment, the system 10 utilizes an improved Wasserstein GAN ("IWGAN"), such as the one disclosed in Gulrajani et al., "Improved Training of Wasserstein GANs", arXiv:1704.00028v3 [cs.LG] (Dec. 25, 2017), the entire disclosure of which is incorporated herein by reference. In one embodiment, both the generator and discriminator of the IWGAN are simple convolutional neural networks (CNNs). The discriminator takes as input a latent noise vector, transforms it by forwarding it through its convolutional layers, and outputs a sequence of 32 one-hot character vectors. A softmax nonlinearity is applied at the output of the generator, and then forwarded to the discriminator. Each output character from the IWGAN is obtained by computing the argmax of each output vector produced by the generator.

The present invention facilitates the ability of GANs to effectively estimate the probability distribution of passwords from a training set, utilizing a variety of parameters. In one embodiment, the system 10 is instantiated using training processes of IWGANs, such as those as disclosed in the Gulrajani et al. article cited above. Further, in one embodiment, in order to minimize training errors, i.e., to reduce mismatches between the output of the model and its training data, IWGAN implementation relies on the "ADAM optimizer" disclosed in D. Kingma et al., "Adam: A Method for Stochastic Optimization", arXiv:1412.6980 [cs.LG] (2014), the entire disclosure of which is incorporated herein by reference. For example, from Gulrajani et al, in some embodiments, the algorithm for training can comprise the pseudo-code shown below:

Require: The gradient penalty coefficient $\lambda$, the number of critic iterations per generator iteration $n_{critic}$, the batch size m, Adam hyperparameters $\alpha$, $\beta_1$, $\beta_2$.
Require: initial critic parameters $\omega_0$, initial generator parameters $\theta_0$.

```
1:   while θ has not converged do
2:      for t = 1, . . . , n_critic do
3:         for i = 1, . . . , m do
4:            Sample real data x ~ ℙ_r, latent variable z ~ p(z),
              a random number ε ~ U[0, 1].
5:            x̃ ← G_θ(z)
6:            x̂ ← εx + (1 − ε)x̃
7:            L^(i) ← D_ω(x̃) − D_ω(x) + λ(‖∇_x̂ D_ω(x̂)‖_2 − 1)^2
8:         end for
9:
```
$$\omega \leftarrow \text{Adam}\left(\nabla_\omega \frac{1}{m}\sum_{i=1}^{m} L^{(i)}, \omega, \alpha, \beta_1, \beta_2\right)$$

```
10:     end for
11:     Sample a batch of latent variables {z^(i)}_{i=1}^m ~ p(z).
12:
```
$$\theta \leftarrow \text{Adam}\left(\nabla_\theta \frac{1}{m}\sum_{i=1}^{m} -D_\omega(G_\theta(z)), \theta, \alpha, \beta_1, \beta_2\right)$$

```
13:  end while
```

Further, from D. Kingma et al., in some embodiments, the algorithm for training can comprise the Adam pseudo-code shown below:

```
Require: α: Stepsize
Require: β_1,β_2 ∈ (0,1]: Exponential decay rates for the first and
  second moment estimates
Require: f(θ): Stochastic objective function with parameters θ
Require: θ_0: Initial parameter vector
  m_0 ← 0 (Initialize initial 1^st moment vector)
  v_0 ← 0 (Initialize initial 2^nd moment vector)
  t ← 0 (Initialize timestep)
  while θ^t not converged do
    t ← t + 1
    g_t ← ∇_θ f_t(θ_{t−1}) (Get gradients w.r.t. stochastic objective at timestep t)
    m_t ← β_1 · g_t + (1 − β_1) · m_{t−1} (Update biased first
    moment estimate)
    v_t ← β_2 · g_t^2 + (1 − β_2) · v_{t−1} (Update biased second raw
    moment estimate)
    m̂_t ← m_t / (1 − (1 − β_1)^t) (Compute bias-corrected first
    moment estimate)
    v̂_t ← v_t / (1 − (1 − β_2)^t) (Compute bias-corrected second raw
    moment estimate)
    θ_t ← θ_{t−1} − α · m̂_t / (√v̂_t + ε)
    (Update parameters)
  end while
  return θ^t (Resulting parameters)
```

In certain embodiments, the implementation of the present invention may be based on one or more hyper-parameters, including, but not limited to:

Batch size, which represents the number of passwords from the training set that propagate through the GAN at each step of the optimizer.

Number of iterations, which indicates how many times the GAN invokes its forward step and its back-propagation step. In each iteration, the GAN runs one generator iteration and one or more discriminator iterations.

Number of discriminator iterations per generator iteration, which indicates how many iterations the generator performs in each GAN iteration.

Model dimensionality, which represents the number of dimensions (weights) for each convolutional layer.

Gradient penalty coefficient (λ), which specifies the penalty applied to the norm of the gradient of the discriminator with respect to its input. Increasing this parameter leads to a more stable training of the GAN.

Output sequence length, which indicates the maximum length of the strings generated by the generator G.

Size of the input noise vector (seed), which determines how many random bits are fed as input to the generator G for the purpose of generating samples.

Maximum number of examples, which represents the maximum number of training items (i.e., passwords) to load.

Adam optimizer's hyper-parameters:
  Learning rate, i.e., how quickly the weights of the model are adjusted.
  Coefficient β1, which specifies the decaying rate of the running average of the gradient.
  Coefficient β2, which indicates the decaying rate of the running average of the square of the gradient.

In certain embodiments, in an example "A", the GAN of the system 10 is instantiated with a batch size of 64. The GAN is trained using various numbers of iterations and eventually 199,000 iterations, as further iterations may provide diminishing returns in the number of matches. The number of discriminator iterations per generative iteration is set to 10. Five (5) residual layers are being used for both the generator 20 and the discriminator 40, with each of the layers in both deep neural network having 128 dimensions. The gradient penalty is set to 10 and the length of the sequence generated by the GAN is modified from 32 characters (default length for IWGAN) to 10 characters, to match the maximum length of passwords used during training. The maximum number of examples loaded by the GAN is set to the size of the entire training dataset. The size of the noise vector is set to 128 floating point numbers. Coefficients β1 and β2 of the Adam optimizer utilized to minimize the training error, are set to 0.5 and 0.9, respectively, while the learning rate is $10^{-4}$.

In other embodiments, the hyper-parameters discussed above can be modified or adjusted to any suitable levels or settings in accordance with specific operational/functional requirements of the system 10, and/or any specific datasets utilized, etc. For instance, the GAN of the system 10 can be trained in any number of iterations suitable to enhance the accuracy and performance of the system 10. Accordingly, the specific examples of the hyper-parameters provided herein are intended for illustration purposes only and are not meant to limit the scope of the present invention.

Figure 1B:
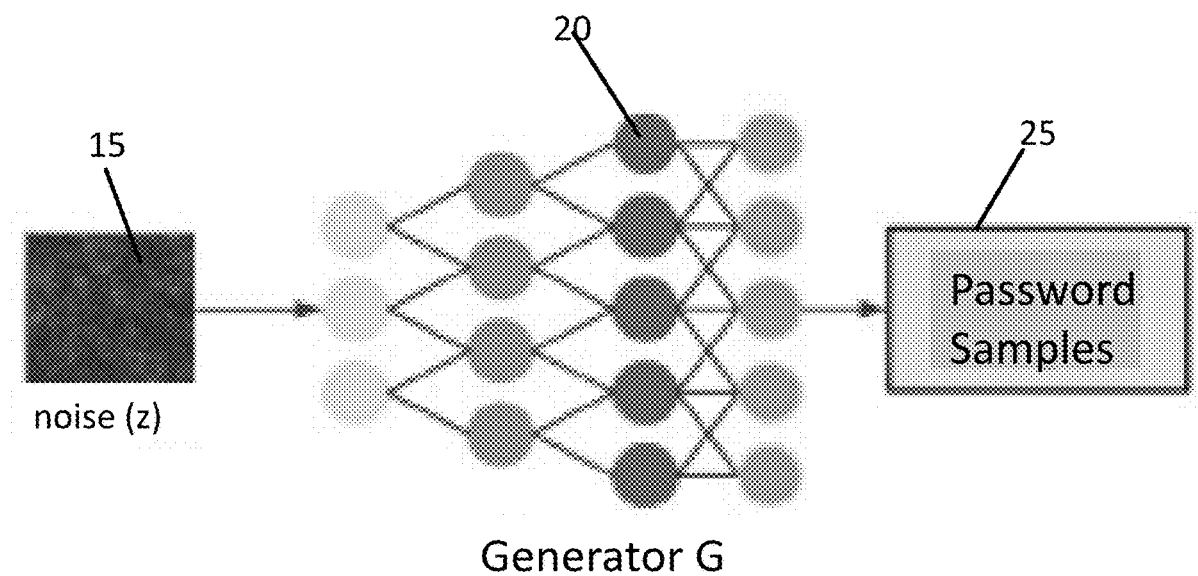
FIG. 1B is a diagram illustrating a password generation procedure, in accordance with an embodiment of the present invention.

Referring to FIGS. 1A and 1B, training and testing procedures for the system 10 will be discussed below. As shown in FIG. 1A, the discriminator 40 processes passwords from a training dataset 35, as well as password samples 25 produced by the generator 20. Based on the feedback from the discriminator 40, the generator 20 fine-tunes its network to produce password samples 45 that are close to the training set (the generator 20 has no direct access to the training set).

Referring now to FIG. 1B, there is illustrated a password generation procedure. The generator 20 receives, as input, a latent noise vector 15, transforms it by forwarding it through its convolutional layers of the generator 20, and outputs fake password samples as one-hot character vectors (password samples 25).

The system 10 represents a principled and theory-grounded take on the generation of password guesses. In accordance with embodiments of the present invention, a properly-trained GAN can generate high-quality password guesses. The password generation GAN can be trained on any known passwords dataset or datasets and tested on any different known dataset or datasets. In one embodiment, the GAN can be trained on a portion of the password dataset known as "RockYou" (hereinafter "the RockYou dataset") and then tested on two different datasets: (1) a subset of the RockYou dataset, which was not used in the training process; and (2) a dataset of leaked passwords from LinkedIn® (hereafter "the LinkedIn® dataset"). LinkedIn® and its logo are registered trademarks of LinkedIn Corporation and its affiliates in the US and other countries.

Training and testing experiments were performed using the TensorFlow implementation of IWGAN. TensorFlow version 1.2.1 for GPUs, with Python version 2.7.12, was utilized. The experiments were performed on a workstation running Ubuntu 16.04.2 LTS, with 64 GB of RAM, a 12-core 2.0 GHz Intel Xeon CPU, and an NVIDIA GeForce GTX 1080 Ti GPU with 11 GB of global memory. The hyper-parameters described above with respect to example "A" were utilized.

The GAN is trained on a large set of passwords from the RockYou dataset. Entries in this dataset represent a mixture of common and complex passwords: because they were stored on servers in plaintext, passwords of all complexities were recovered. It was then determined how many of the passwords generated by the GAN were present in two separate testing sets: a subset of RockYou distinct from the training set, and the LinkedIn® password dataset.

The RockYou dataset contained 32,503,388 passwords. All passwords of length ten characters or less (29,599,680 passwords, which correspond to 90.8% of the dataset) were selected and 80% of them are used (23,679,744 total passwords, 9,926,278 unique passwords) to train the password guessing tool of the system 10. For testing, the difference between the remaining 20% of the dataset (5,919,936 total passwords, 3,094,199 unique passwords) and the training test was computed. The resulting 1,978,367 entries correspond to passwords that were not previously observed by the password guessing tool. This allowed counting of only non-trivial matches in the testing set.

The password guessing tool was tested on passwords from the LinkedIn® dataset, of length up to ten characters, and that were not present in the training set. The LinkedIn® dataset contained 60,065,486 total unique passwords (43,354,871 unique passwords with length ten characters or less), out of which 40,593,536 were not in the training dataset. (Frequency counts were not available for the LinkedIn® dataset.) Passwords in the LinkedIn® dataset were exfiltrated as hashes, rather than in plaintext. As such, the LinkedIn® dataset contained only plaintext passwords that tools such as those known as "JTR" and "HashCat" were able to recover, thus giving rule-based systems a potential edge.

With the foregoing training and testing procedures, it was determined: (1) how well the system 10 predicts passwords when trained and tested on the same password distribution (i.e., when using the RockYou dataset for both training and testing); and (2) whether the system 10 generalizes across password datasets, i.e., how it performs when trained on the RockYou dataset, and tested on the LinkedIn® dataset.

The impact of the training process on overfitting was examined. Training a GAN is an iterative process that includes a large number of iterations. As the number of iterations increases, the GAN learns more information from the distribution of the data. However, increasing the number of steps also increases the probability of overfitting. To evaluate this tradeoff on password data, intermediate training checkpoints are stored and $10^8$ passwords were generated at each checkpoint.

Figure 2:
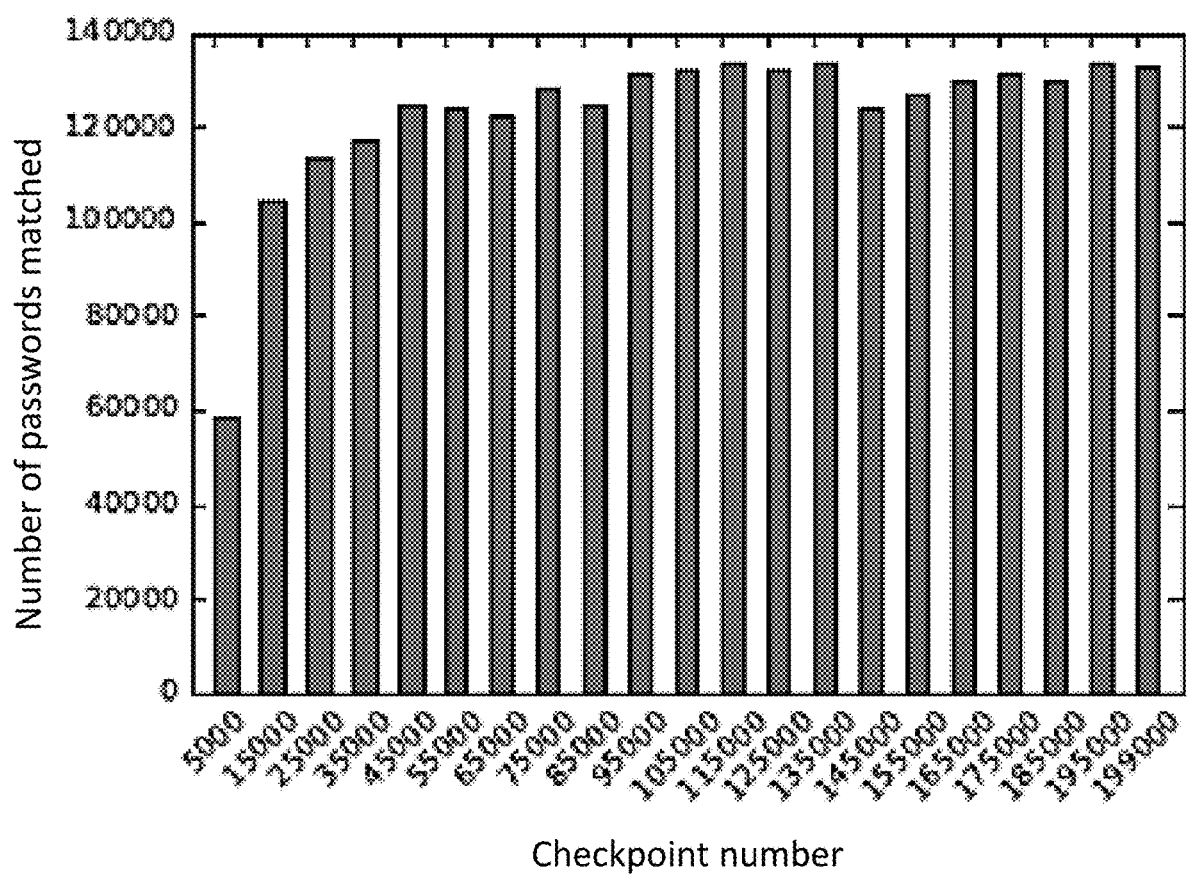
FIG. 2 illustrates the number of passwords generated by the system of FIG. 1A at various checkpoints, in accordance with an embodiment of the present invention.
Figure 5:
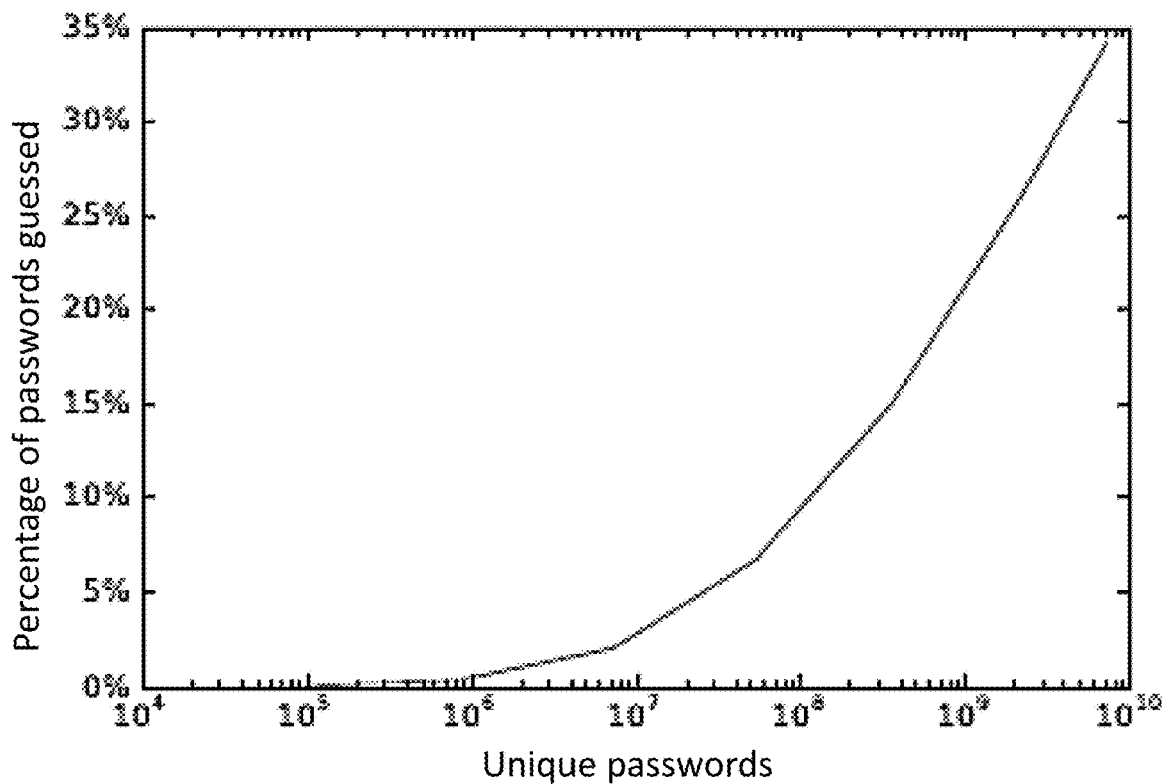
FIG. 5 is graph illustrating the percentage of passwords generated by the system of FIG. 1A and matching passwords in a test set, in accordance with an embodiment of the present invention.

FIG. 2 illustrates the number of passwords generated by the system of FIG. 1A at various checkpoints, and how many of these passwords matched with the content of the RockYou testing set. In general, the number of matches increases with the number of iterations. This increase tapers off around 125,000-135,000 iterations, and then again around 190,000-195,000 iterations, where training of GAN is stopped.

The probability density can be estimated. For example, the ability of the GAN to match passwords within a limited number of attempts depends on its ability to correctly estimate the frequency of passwords. A correct frequency estimate enables the GAN to match common passwords, and passwords with similar structure, within a small number of guesses. For instance, because 123456 represents more than 1% of the passwords in the training set, this password should also appear with roughly the same frequency in the GAN's output.

To evaluate the ability of the GAN to estimate the distribution of passwords from the training set, a batch of $10^{10}$ passwords are generated, and the frequency of each password within the batch is calculated. Then these frequencies with the corresponding frequencies in the training set (ground truth) are compared.

FIG. 3 is a table showing the frequency of the fifty most common outputs of the GAN and corresponding frequency and rank in the RockYou training set. Passwords are sorted in the table in FIG. 3 by the frequency in which they appear in the outputs. The "—" symbol indicates that the password was not in the training set. FIG. 3 shows that the GAN of the present invention was able to correctly estimate the probabilities of many of the fifty most frequent passwords. Specifically, 40% of the fifty most frequent passwords generated by the GAN are among the 100 most frequent passwords in the training set.

Figure 6:
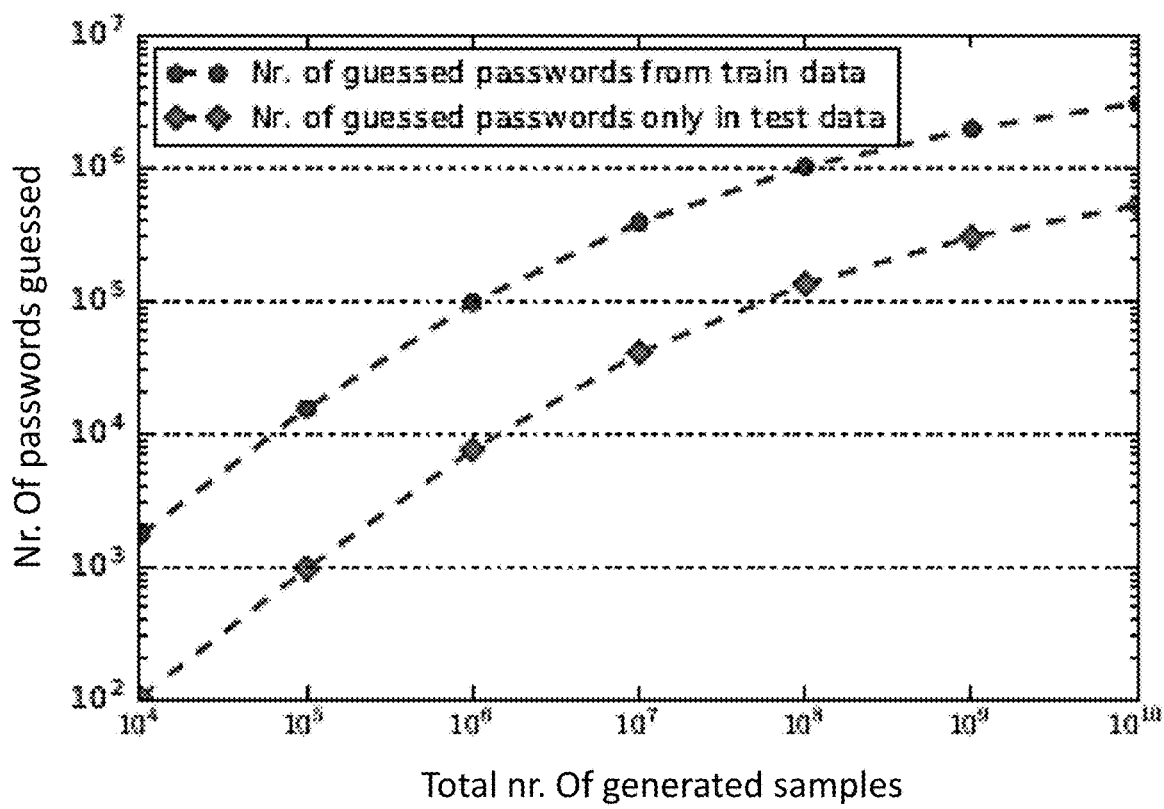
FIG. 6 is a graph illustrating the number of passwords generated by the system of FIG. 1A that appear in training and testing sets, as the number of samples in the system's output increases, in accordance with an embodiment of the present invention.

To evaluate the size of the password space generated by the system 10, several password sets with sizes between $10^4$ and $10^{10}$ were generated. As the number of passwords increased, so did the number of unique (and therefore new) passwords (see FIG. 4, which is a table illustrating the number of passwords generated by the system 10 that matched passwords in the RockYou testing set, and FIG. 5, which is a graph illustrating the percentage of passwords generated by the system 10 (x-axis) that match passwords in the RockYou testing set). When the number of passwords generated by the password system is increased, the rate at which new unique passwords were generated decreased only slightly. Similarly, the rate of increase of the number of matches diminished slightly as the number of passwords generated increased (see FIG. 5, as well as FIG. 6, illustrating the number password generated by the GAN that appear in the training and testing sets, as the number of samples in the GAN's output increase). This is to be expected, as the simpler passwords are matched early on, and the remaining (more complex) passwords require a substantially larger number of attempts in order to be matched.

FIG. 7 is a table illustrating a small sample of passwords that were produced by the GAN, which look similar to potential human-generated passwords, but did not match on either the RockYou or LinkedIn® test sets. Passwords generated by the GAN that do not match any of the testing sets are determined as passwords that are reasonable candidates for human-generated passwords. As such, it is speculated that a possibly large number of passwords generated by the GAN, and that do not match the test sets, might still match user accounts from services other than RockYou and LinkedIn®.

The GAN of the present invention was able to match 34.2% of the passwords in a testing set extracted from the RockYou password dataset, when trained on a different subset of RockYou. Further, 21.9% of the password in the LinkedIn® dataset was matched when the GAN of the present invention was trained on the RockYou password set. This is remarkable, because the GAN of the present invention was able to achieve these results with no additional information on the passwords that are present only in the testing dataset. In other words, the GAN of the present invention was able to correctly guess a large number of passwords that it did not observe after being given access to nothing more than a set of samples.

In one embodiment, the output of the machine-learning-based password guess tool of the present invention may be combined with that of one or more rule-based password guessing tools, such as those known as "JRT Spyderlab", "Markov Model 3-gram", "HashCat Best64" and "FLA", the system proposed by Melicher et al, "Fast, Lean, and Accurate: Modeling Password Guessability Using Neural Networks", 25th USENIX Security Symposium (USENIX Security 16), Austin, Tex., USENIX Association, 2016, pp. 175-191, available online https://www.usenix.org/conference/usenixsecurity16/technical-sessions/presentation/melicher (the entire disclosure which is incorporated herein by reference), to increase the overall password guessing effectiveness. For instance, the output of the machine-learning based password guess tool and the FLA password guess tool may be combined to supplement the results from each other.

Additional documents, including Hitaj et al., "PassGAN: A Deep Learning Approach for Password Guessing", arXvi: 1709.004402v1 [cs.CR] (2017) and arXvi:1709.004402v2 [cs.CR] (2018), respectively, contain additional disclosures relating to the present invention, and their entire disclosures are incorporated herein by reference for all purposes.

Any of the methods and operations described herein that form part of the invention can be useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Figure 8:
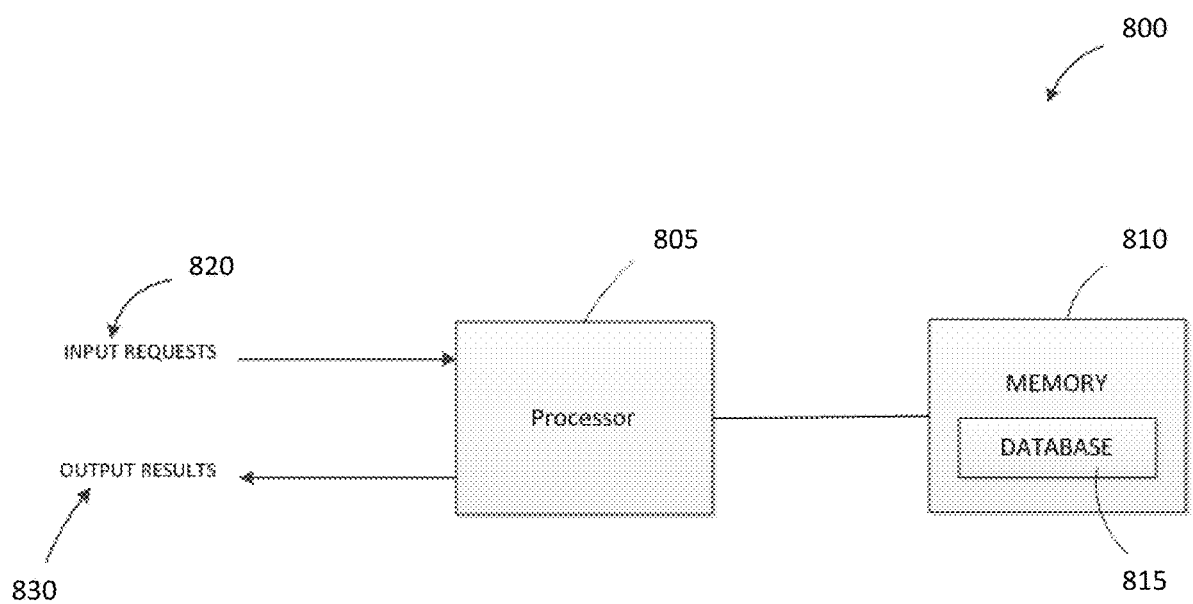
FIG. 8 illustrates a non-limiting block diagram of a system capable of implementing any one or more of the methods or processes disclosed herein.

FIG. 8 shows a non-limiting example embodiment of a block diagram of a computer system 800 including the capability to implement any one or more of the methods described herein. The computer system 800 includes a processor 805 connected with a memory 810, where the memory 810 is configured to store data. In some embodiments, the generator 20 and discriminator 40 can each be embodied as program logic executable by processor 805, and at least a portion of the program logic can be stored on the memory 810. For example, generator 20 can be embodied by a first logic module executable by the processor 805, and the discriminator 40 can be embodied by a second logic module executable by the processor 805. In other embodiments, the generator 20 and discriminator 40 can be embodied in program logic distributed across more than one computer system.

In some embodiments, the processor 805 is configured to interface or otherwise communicate with the memory 810, for example, via electrical signals propagated along a conductive trace or wire. In an alternative embodiment, the processor 805 can interface with the memory 810 via a wireless connection. In some embodiments, the memory 810 can include a database 815, a plurality of data or entries stored in the database 815 of the memory 810.

As discussed in greater detail herein, in some embodiments, the processor 805 can be tasked with executing software or other logical instructions to perform one or more of the aforementioned methods, including, but not limited to, the methods embodied by the first and second logic modules. In some embodiments, input requests 820 can be received by the processor 805 (e.g., via signals transmitted from a user at a remote system or device, such as a handheld device like a smartphone or tablet, to the processor 805 via a network or internet connection). In an alternative embodiment, the input requests 820 can be received by the processor 805 via a user input device that is not at a geographically remote location (e.g., via a connected keyboard, mouse, etc. at a local computer terminal). In some embodiments, after performing tasks or instructions based upon the user input requests 820, for example, looking up information or data stored in the memory 810, the processor 805 can output results 830 back to the user that are based upon the input requests 820.

Although one or more of the method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be understood that the embodiments described herein are merely exemplary and that a person skilled in the art may make many variations and modifications without departing from the spirit and scope of the invention. All such variations and modifications are intended to be included within the scope of the invention.

The invention claimed is:

1. A system comprising:
    at least one processor configured to be coupled to a non-transitory computer-readable storage medium, the non-transitory computer-readable storage medium tangibly storing thereon a program logic for execution by the at least one processor, the program logic including:
    a first logic module executable by the at least one processor for receiving at least one data stream, wherein the first logic module includes at least one neural network configured to generate at least one first password sample based at least in part on at least a portion of the at least one data stream; and
    a second logic module executable by the at least one processor, the second logic module being operatively coupled to the first logic module,
    wherein the second logic module is configured to receive the at least one first password sample and at least one input dataset including at least one second password sample to perform calculations in order to distinguish between at least one password of the at least one first password sample and at least one password of the at least one second password sample, and to iteratively learn and produce a feedback dataset based on the calculations, the feedback dataset being configured to be provided to the first logic module.

2. The system of claim 1, wherein the at least one data stream includes a random Gaussian or uniform distribution.

3. The system of claim 1, wherein the feedback dataset provided to the first logic module is used to generate further password samples that are distributed closer to the at least one second password sample.

4. The system of claim 1, wherein the at least one neural network is configured to generate the at least one first password sample based at least in part on at least a portion of the feedback dataset.

5. The system of claim 1, wherein the feedback dataset is calculated by the at least one first logic module by iterative learning and convergence to at least one optimization solution of at least one model.

6. The system of claim 5, wherein the at least one model utilizes:

$$\min_{\theta_G} \max_{\theta_D} \sum_{i=1}^{n} \log f(x_i; \theta_D) + \sum_{j=1}^{n} \log(1 - f(g(z_j; \theta_G); \theta_D))$$

where $\theta_G$ and $\theta_D$ are the parameters of the first and second logic modules, $x_i$ represents an input dataset, and $z_j$ is a noise distribution.

7. The system of claim 1, wherein the at least one neural network of the first logic module includes a generative deep neural network, and wherein the second logic module includes a discriminative deep neural network, the generative deep neural network and discriminative deep neural network in combination forming a generative adversarial network (GAN).

8. The system of claim 7, wherein the generative adversarial network (GAN) includes an improved Wasserstein generative adversarial network (IWGAN).

9. The system of claim 8, wherein the program logic executable by the at least one processor includes code configured to train the generative adversarial network (GAN) including the improved Wasserstein generative adversarial network (IWGAN) using a gradient penalty.

10. The system of claim 1, wherein the program logic executable by the at least one processor includes code configured to generate a training operation for the first logic module and the second logic module, the training operation including operations configured to exchange password-related data between the first and second logic modules based at least in part on the at least one data stream and the at least one input dataset.

11. The system of claim 10, wherein the training operation is configured to include a first logic module iteration associated with one or more second logic module iterations.

12. A method comprising;
    (a) providing at least one non-transitory computer-readable storage medium including program logic of a generative adversarial network (GAN);
    (b) providing at least one processor configured to be operatively coupled to the at least one non-transitory computer-readable storage medium;
    (c) executing, by the at least one processor, at least a portion of a first logic module of the program logic to generate at least one first password sample based at least in part on at least a portion of at least one data stream received by the at least one processor;
    (d) executing, by the at least one processor, at least a portion of a second logic module, the second logic module operatively coupled to the first logic module, wherein the second logic module receives the at least one first password sample from the first logic module and at least one second password sample from at least one input dataset, and wherein the at least one processor performs calculations based on at least one model in order to distinguish between at least one password of the at least one first password sample and at least one password of the at least one second password sample and to iteratively and produce a feedback dataset based on the calculations;
    (e) providing the feedback dataset to the first logic module.

13. The method of claim 12, further comprising the step of (f) executing, by the at least one processor, at least a portion of the first logic module to update the at least one first password sample with at least one further password sample based at least in part on at least a portion of the at least one data stream and the feedback dataset.

14. The method of claim 13, further comprising the steps of (g) providing the at least one first password sample including the at least one further password sample from the first logic module to the second logic module; and (h) repeating the steps (c)-(f) at least once to generate further password samples that are distributed closer to password samples of the at least one input dataset.

15. The method of claim 12, wherein the first logic module includes a generative deep neural network, and wherein the second logic module includes a discriminative deep neural network.

16. The method of claim 12, wherein the generative adversarial network (GAN) includes an improved Wasserstein generative adversarial network (IWGAN).

17. The method of claim 12, wherein the at least one model utilizes:

$$\min_{\theta_G}\max_{\theta_D} \sum_{i=1}^{n} \log f(x_i; \theta_D) + \sum_{j=1}^{n} \log(1 - f(g(z_j; \theta_G); \theta_D))$$

where $\theta_G$ and $\theta_D$ are the parameters of the first and second logic modules, $x_i$ represents an input dataset, and $z_j$ is a noise distribution.

18. The method of claim 12, wherein the program logic executable by the at least one processor includes code that performs a training operation for the first logic module and the second logic module, the training operation including operations involving exchange of password-related data between the first and second logic modules based at least in part on the at least one data stream and the at least one input dataset.

19. The method of claim 18, wherein the training operation includes a first logic module iteration associated with one or more second logic module iterations.

20. The method of claim 16, wherein the generative adversarial network (GAN) including the improved Wasserstein generative adversarial network (IWGAN) is trained using a gradient penalty.

* * * * *